C. A. MOORE.
ELECTRICAL REGULATOR.
APPLICATION FILED MAY 17, 1911.
1,117,689.
Patented Nov. 17, 1914.
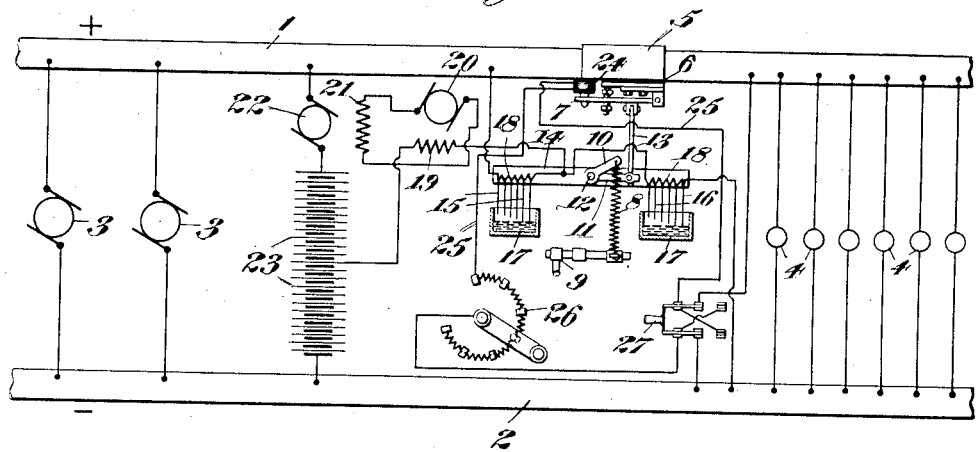
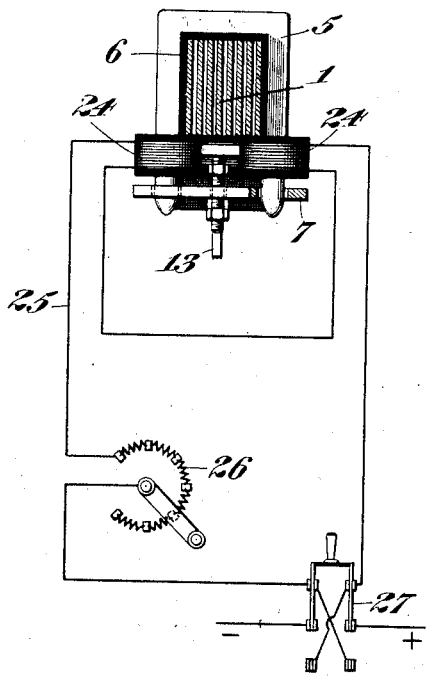
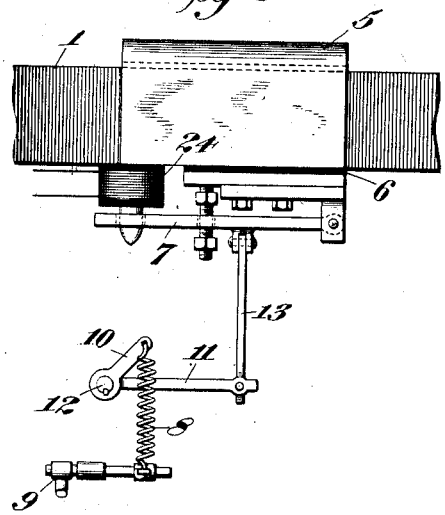
WITNESSES,
Elmer Seavey
Robert A. Berrs
INVENTOR.
Charles A. Moore
by Geo. E. Thackray
his ATTORNEY.

UNITED STATES PATENT OFFICE.

CHARLES A. MOORE, OF JOHNSTOWN, PENNSYLVANIA.

ELECTRICAL REGULATOR.

1,117,689.  Specification of Letters Patent.  Patented Nov. 17, 1914.

Application filed May 17, 1911. Serial No. 627,699.

*To all whom it may concern:*

Be it known that I, CHARLES A. MOORE, a citizen of the United States, residing in the city of Johnstown, in the county of Cambria and State of Pennsylvania, have invented certain new and useful Improvements in Electrical Regulators; and I do hereby declare the following to be a full, clear, and exact description of the invention, such as will enable others skilled in the art to which it appertains to make and use the same.

My invention relates to regulators for boosters which are used in connection with storage batteries for maintaining a constant load upon the electrical generators of a power plant.

Its object is to cause a given variation in load to have a constant effective value to produce regulation, regardless of the amount of the total load.

With other regulators a given variation in load has a greater effective value to produce regulation when the total load is small than when it is large. One reason for this is that the adjustment of these regulators to suit different total loads is frequently accomplished by changing the pulling strength of springs or weights.

It has been customary to regulate the load on the power plant generators by varying the field strength of the booster or the exciter for the booster and by varying the direction of the current in the fields of the same. The amount of variation has been governed by the motion of an armature which is acted upon by the opposing forces of an electromagnet and springs or weights, the coils of the magnet being in series with the main circuit. The pull of the springs is just balanced by the pull exerted by the magnet when the current flowing through the coils has a certain fixed strength. When the current increases, the armature is pulled toward the magnet against the action of the springs or weights, and this motion of the armature, by means of suitable mechanism, varies the field strength of the booster in such a manner as to cause the storage battery to discharge, thus bringing the generator load back to normal. However, if the desired load on the generators is to be increased, it is necessary to increase the pull of the springs, as the pull of the electromagnet is also increased. It has been found that the spring, being under a greater tension, will have a greater reaction or resistance so that a given increment of current will not be able to cause the armature to move through as great a distance and consequently, the regulator is not as sensitive when the generators have a heavy load as it is when they have a light one. This has been found to be true even though the elastic limit of the spring is not exceeded. Furthermore the desired variation of generator load may be so great as to make it difficult or impossible to provide a spring having the requisite range. In case a weight is used in place of a spring, the weight must be increased in proportion to the desired load, with the result that a given absolute fluctuation of current will have a proportionately smaller regulating effect as the desired normal load increases. I overcome this defect by using a shunt coil or coils on the electromagnet in addition to the usual apparatus and provide means whereby the lines of force produced by these coils may be caused to aid or to oppose the lines of force produced by the series coil, as desired. I also provide means for varying the current passing through the shunt coils so as to regulate their effect on the electromagnet. Thus I am able to keep the stiffness of the spring a constant, so that a given change in current will always move the armature the same distance, making the regulator equally sensitive for all loads.

Referring to the sheet of drawings forming a part of this specification, in which like characters of reference indicate like parts throughout the views:—Figure 1 is a diagrammatic view of a wiring system showing a booster regulator embodying my invention. Fig. 2 is an enlarged end view of the electromagnet shown in Fig. 1, showing the bus-bar in cross section and the shunt circuit diagrammatically. Fig. 3 is a side elevation of the apparatus shown in Fig. 2, the circuit being omitted, and also shows suitable means for opposing the pull of the electromagnet.

In the drawings, 1 and 2 indicate respectively the positive and negative bus-bars which receive the current from the generators 3, and to which the various elements of the load 4 are connected. The U-shaped member 5, preferably of soft iron or steel capable of being easily magnetized, is shown as mounted on the bus-bar 1, being separated therefrom by the insulation 6, but it should be understood that, so far as the member 5 is concerned, the bus-bar may be replaced by a coil in series with the main circuit without affecting the action of the apparatus. The bus-bar, or the series coil, whichever is used, acts as a winding to make an electromagnet of the member 5.

The current in the main circuit magnetizes the member 5 and causes it to attract the armature 7, opposing the force exerted upon the latter by the spring 8. The pull of the spring may be regulated by any suitable means such as indicated by 9. The levers 10 and 11, the shaft 12 and the rod 13 transmit the pull of the spring to the armature. The beam 14 is attached to the shaft 12, consequently any motion of the armature causes a corresponding angular motion of the beam.

The contacts 15 and 16 are mounted on beam 14 so that as the beam is tilted, one or the other of these contacts is plunged into mercury in the cups 17. The fingers or points in each of the contacts are connected by the variable resistance 18 and are of different lengths so that they enter the mercury one at a time, thereby gradually short-circuiting the resistance. The contacts are both connected to the field 19 of the exciter 20 which controls the field 21 of the booster 22. The booster is connected across the bus-bars in series with the storage battery 23. The exciter field is preferably connected to the middle of the storage battery, and the contacts 15 and 16 are connected to the bus-bars 1 and 2 respectively. The resistance in the two circuits is such that when the beam 14 is in its middle position the two contacts have the same potential and the exciter field coils do not receive any current. Then if the current in the main circuit starts to increase, the armature 7 is pulled toward the magnet, thus plunging some of the points of contact 15 into the mercury and cutting out resistance in that circuit so that current will flow from bus-bar 1 through contact 15 and exciter field 19 to the battery. This causes the booster to operate in such a manner that the battery will discharge, and the load on the generators will be reduced to normal. Should the current start to drop, the spring 8 will pull the armature away from the magnet, thereby plunging contact 16 into the mercury and causing current to flow from the battery through the exciter field 19 and contact 16 to bus-bar 2, thus reversing the booster and causing the battery to charge so as to hold the load on the generators up to normal.

The above apparatus is but one of many to which my invention may be applied.

My invention consists principally in the use of a shunt coil or coils which I shall now describe:—The shunt coils 24 are mounted on the member 5 and are connected by means of the wires 25, to the bus-bars. The rheostat 26 permits the resistance of this circuit to be varied as desired, and the switch 27 is arranged so that the current in the shunt coils may be reversed. Thus the position of switch 27 determines whether the coils 24 are to aid or to oppose the bus-bar in magnetizing the member 5, and the rheostat 26 regulates the amount of such aid or opposition as the case may be. Assuming that the spring has been regulated to balance the magnet pull corresponding to a given current strength in the main circuit, then, if the desired total load on the generators is to be increased, I connect the shunt coils differentially with the bus-bar and vary the resistance in the shunt circuit until the effect of the additional current strength in the bus-bar is neutralized. The magnet then exerts the same pull on the armature as it did under the original conditions, so that the pull of the spring does not have to be changed. When the load on the generators is to be smaller than that for which the spring was set, I connect the shunt coils comulatively with the bus-bar and regulate the resistance in the shunt circuit until the pull of the magnet just balances that of the spring. Thus it will be seen that, in my invention, the spring is set to balance the magnet pull corresponding to a certain current in the main circuit, and that, whenever this current is to be changed, the shunt coils are used to neutralize the change in magnetic strength caused by the change in current, so that the pull of the spring may remain constant.

The above describes the application of my invention to booster-regulators for power systems in which a storage battery is employed to equalize the load. In such distribution systems the electric energy is supplied at constant potential and it results that the electromotive force across the terminals of the shunt containing coils 24 remains constant. In other words, the shunt is in this case a source of constant current, adjustable by the rheostat 26, and may be replaced by any other suitable source of constant current. In fact, if the invention is to be applied to a system in which the voltage does not remain constant, it is not sufficient to place the neutralizing coils 24 in a simple shunt as above described. They must, in that case, be supplied with a constant adjustable current from some other source.

When I speak of varying the resistance of the shunt circuit whenever the load on the generators is to be different from that for which the spring was set, I do not refer to any mere fluctuations, as the booster and storage battery are provided for the purpose of taking care of these, as will be understood by those skilled in the art.

Although I have shown and described my invention in considerable detail, I do not wish to be limited to the exact and specific details shown and described, but may use such substitutions, modifications or equivalents thereof as are embraced within the scope of my invention, or as pointed out in the claims.

Having thus described my invention, what I claim and desire to secure by Letters Patent is:

In a regulator for electric supply systems, an electromagnet provided with an armature subjected to a retractive force, said electromagnet having an exciting winding carrying current of the system to be regulated, an additional winding on the magnet, and connections, including an adjustable rheostat and a reversing switch, for supplying current to said additional winding to neutralize the effect of predetermined variations in the normal conditions of the system and thereby render the effective regulating value of a given fluctuation substantially independent of such predetermined variations.

In testimony whereof I hereto affix my signature in the presence of two witnesses.

CHARLES A. MOORE.

Witnesses:
 ELMER SEAVEY,
 ROBERT A. BEERS.

Copies of this patent may be obtained for five cents each, by addressing the "Commissioner of Patents, Washington, D. C."